(12) United States Patent
Metzger et al.

(10) Patent No.: US 7,675,861 B2
(45) Date of Patent: Mar. 9, 2010

(54) ACTIVE PROBE TARGET MANAGEMENT

(75) Inventors: Larry R. Metzger, Wake Forest, NC (US); Lei Xia, Fremont, CA (US); Dana Blair, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 1250 days.

(21) Appl. No.: 11/113,582

(22) Filed: Apr. 25, 2005

(65) Prior Publication Data

US 2006/0239201 A1    Oct. 26, 2006

(51) Int. Cl.
*G01R 31/08* (2006.01)
(52) U.S. Cl. .................. 370/241; 370/252; 370/254
(58) Field of Classification Search ............... 370/252, 370/241, 254, 389
See application file for complete search history.

(56) References Cited

U.S. PATENT DOCUMENTS

| | | | |
|---|---|---|---|
| 5,359,595 A * | 10/1994 | Weddle et al. | ............... 370/468 |
| 6,075,769 A | 6/2000 | Ghanwani et al. | |
| 6,292,832 B1 | 9/2001 | Shah et al. | |
| 6,324,656 B1 | 11/2001 | Gleichauf et al. | |
| 6,400,686 B1 | 6/2002 | Ghanwani et al. | |
| 6,446,121 B1 | 9/2002 | Shah et al. | |
| 6,470,073 B1 | 10/2002 | Fish et al. | |
| 6,600,724 B1 | 7/2003 | Cheng | |
| 6,717,920 B1 | 4/2004 | Cheng | |
| 6,775,280 B1 | 8/2004 | Ma et al. | |
| 6,804,712 B1 | 10/2004 | Kracht | |
| 6,868,068 B1 | 3/2005 | Jain et al. | |
| 6,868,094 B1 | 3/2005 | Bordonaro et al. | |
| 2002/0133491 A1* | 9/2002 | Sim et al. | ..................... 707/10 |
| 2003/0147386 A1 | 8/2003 | Zhang et al. | |
| 2003/0161313 A1* | 8/2003 | Jinmei et al. | ................. 370/392 |
| 2003/0204619 A1* | 10/2003 | Bays | ........................... 709/238 |
| 2003/0208523 A1* | 11/2003 | Gopalan et al. | ............. 709/201 |
| 2003/0217039 A1* | 11/2003 | Kurtz et al. | ..................... 707/1 |
| 2005/0198286 A1* | 9/2005 | Xu et al. | ..................... 709/225 |
| 2006/0221974 A1* | 10/2006 | Hilla et al. | .................. 370/394 |

OTHER PUBLICATIONS

"NetFlow Services Solutions Guide", Oct. 2004, pp. 1-71, Cisco Systems, Inc.

(Continued)

*Primary Examiner*—Kevin C Harper
*Assistant Examiner*—Sai-Ming Chan
(74) *Attorney, Agent, or Firm*—Cesari and McKenna, LLP (57) ABSTRACT

A technique manages targets to which probe packets are sent from a source of a computer network. The novel target management technique dynamically selects an optimal set of valid targets for a particular (monitored) prefix of the computer network. Specifically, one or more targets are selected from a pool of possible learned and configured targets to be used as representatives of the monitored prefix. Probe packets are sent from the source to the selected targets for the duration of an evaluation period. Targets that do not respond to the probe packets during the evaluation period are invalid and deselected, and if available, an unused target is selected from the pool of possible targets to replace each non-responding target for a next evaluation period. Invalid learned targets are discarded, while invalid configured targets are returned to the pool of possible targets for potential re-selection in a later evaluation period.

22 Claims, 5 Drawing Sheets

AVAILABLE TARGETS POOL 400a

| TARGET ADDRESS 405 | CONFIGURED (C) / LEARNED (L) 410 | COUNTER 415 |
|---|---|---|
| T1 | C | 0 |
| T2 | C | 0 |
| T3 | C | 0 |
| T4 | L | 0 |
| T5 | L | 0 |
| T6 | L | 0 |
| T7 | L | 0 |
| T8 | L | 0 |
| ⋮ | | |
| TN | L | 0 |

SELECTED TARGETS 420a: T1–T5
UNUSED TARGETS 425a: T6–TN

OTHER PUBLICATIONS

U.S. Appl. No. 10/980,550, filed Nov. 3, 2004, Shah et al.

Postel, J., RFC 792, entitled Internet Control Message Protocol: Darpa Internet Protocol Specification, Sep. 1981, pp. 1-21.

Postel, J., RFC 862, entitled Echo Protocol, May 1983, p. 1.

Jacobson, V., and Braden, R., RFC 1072, entitled TCP Extensions for Long-Delay Paths, Oct. 1988, pp. 1-15.

Rekhter, Y., and Li, T., RFC 1771, entitled A Border Gateway Protocol 4 (BGP-4), Mar. 1995, pp. 1-54.

Perlman, Radia, Interconnections Second Edition: Bridges, Routers, Switches, and Internetworking Protocols, Addison Wesley, 1999, Sections 12.1 through 12.3, pp. 299-324.

* cited by examiner

PROBE PACKET 300

| HEADER INFORMATION 305 |
| SOURCE ADDRESS 310 |
| DESTINATION ADDRESS 315 |
| PROBE DATA (REQUEST/RETURN) 320 |

ACTIVE PROBE TARGET MANAGEMENT

RELATED APPLICATION

This application is related to commonly owned copending U.S. application Ser No. 11/113,629, entitled ACTIVE PROBE PATH MANAGEMENT, filed by Blair et al. on even date herewith, the contents of which are hereby incorporated in its entirety.

BACKGROUND OF THE INVENTION

1. Field of the Invention

The present invention relates to computer networks and more particularly to managing targets for probe packets transferred in a computer network.

2. Background Information

A computer network is a geographically distributed collection of nodes interconnected by communication links and segments for transporting data between end nodes, such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node or border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and network-topology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled *A Border Gateway Protocol 4 (BGP-4)*, published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol facilitates policy-based routing in which an administrative entity places restrictions on inter-AS routing operations. For example, the administrator of a company's AS may employ a routing policy where network traffic leaving the AS is not permitted to enter a competitor's network, even if the competitor provides an otherwise acceptable routing path. To implement the BGP protocol, each AS includes at least one border node through which it communicates with other, interconnected ASes.

Because data packets enter and exit the AS through the border node, the border node is said to be located at the "edge" of the AS.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

In some networks, border nodes located at edges of ASes, e.g., between an enterprise network and one or more Internet Service Providers (ISPs), may be configured as Optimized Edge Routers (OERs). Here each OER may be configured to periodically select an Optimal Exit Link (OEL) to each ISP for a given destination prefix (a monitored prefix) based on performance, load, cost, and service level agreements (SLAs) associated with connections to the ISP. Ultimately, the end result for the enterprise network is improved Internet performance, better load distribution, and/or lower costs for Internet connections. Techniques that may be used to select the OEL for the monitored prefix include passive monitoring and/or active probing. Passive monitoring relies on gathering information from OERs learned from monitoring conventional user traffic, such as throughput, timing, latency, packet loss, reachability, etc. Active probing, on the other hand, relies on probe packets to measure various parameters associated with accessing the monitored prefix from an originating node (source). Here, the originating node may generate multiple probe packets that are then forwarded via different exits (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links. The originating node may then use the parametric (performance) information (i.e., learned from passive monitoring or active probing) to select an OEL from among the different exits that may be used to reach the destination prefix.

One problem that arises with the use of targets to represent an entire monitored prefix is how to determine if a target is a valid target. For example, while a responding target is a valid target that can be used to measure parametric information, a non-responding target may be caused by a network issue, e.g., policy filtering (e.g., firewalls), "black holes" (i.e., an area of the network with conditions or configurations where packets enter, but do not emerge), "brown-outs" (i.e., temporary network outages), etc., or simply that the target (host) itself was turned off (e.g., for maintenance or other reasons) or otherwise not responding for its own specific (non-network related) reason. In the case of a non-responding target, non-response due to a network failure is valid for purposes of measuring parametric information for the monitored prefix, since a network failure in reaching the target may apply to reaching the entire monitored prefix. Non-response due to the target itself being powered off or otherwise inaccessible or inactive is not valid for measuring parametric information, because it does not represent the monitored prefix as a whole. Also, in the event that all representative targets for a monitored prefix do not respond, the source may improperly conclude that the entire prefix is unreachable, while the prefix in general (other than the non-responding targets) may still exist and function properly.

SUMMARY OF THE INVENTION

The present invention is directed to a technique for managing targets to which probe packets are sent from a source of a computer network. The novel target management technique dynamically selects an optimal set of valid targets for a particular (monitored) prefix of the computer network. Specifically, one or more targets are selected from a pool of possible learned and configured targets to be used as representatives of the monitored prefix. Probe packets are sent from the source to the selected targets for the duration of an evaluation period. Targets that do not respond to the probe packets during the evaluation period are invalid and deselected, and if available, an unused target is selected from the pool of possible targets to replace each non-responding target for a next evaluation period. Invalid learned targets are discarded, while invalid configured targets are returned to the pool of possible targets for potential re-selection in a later evaluation period.

In accordance with one aspect of the present invention, the source maintains the pool of possible learned and configured targets. The pool is illustratively embodied as a table (ordered or unordered) of target addresses, from which the source selects one or more targets (selected targets) that are used to monitor the particular (monitored) prefix at a given time. The remaining unused targets are stored for future use during later evaluation periods. Notably, the pool may also contain a counter for indicating the number of times a target (e.g., a configured target) does not respond to a probe packet.

In accordance with another aspect of the present invention, the source determines the validity of a target based on the responsiveness of that target during the evaluation period. A target that responds (at least once) during the evaluation period is considered a valid target, and remains selected for use by probe packets during a next evaluation period. A target that does not respond to any probe packet during the evaluation period, however, is considered an invalid target and is subsequently deselected from use as a monitored prefix representative. An available unused target (if any) is selected from the pool to replace the invalid target for the next evaluation period accordingly. If the invalid target is a learned target, it is discarded from the pool, and is not used again unless the source relearns the target sometime thereafter. On the other hand, if the invalid target is a configured target, it is deselected and returned to the pool of possible targets, such as to the end of an ordered pool (e.g., a least recently used, LRU, order), and may be selected again once other less recently used targets are deemed invalid and returned to the pool.

Advantageously, the novel technique efficiently manages targets to which probe packets are sent from a source of a computer network. By determining the validity of the targets based on their responsiveness during an evaluation period, the novel target management technique dynamically selects the optimal set of valid targets for a monitored prefix from a pool of possible targets. This dynamically-selected optimal set may be used to learn the overall parameters associated with reaching the monitored prefix, thus avoiding the difficulty in determining the difference between a network issue and a nonresponsive target.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
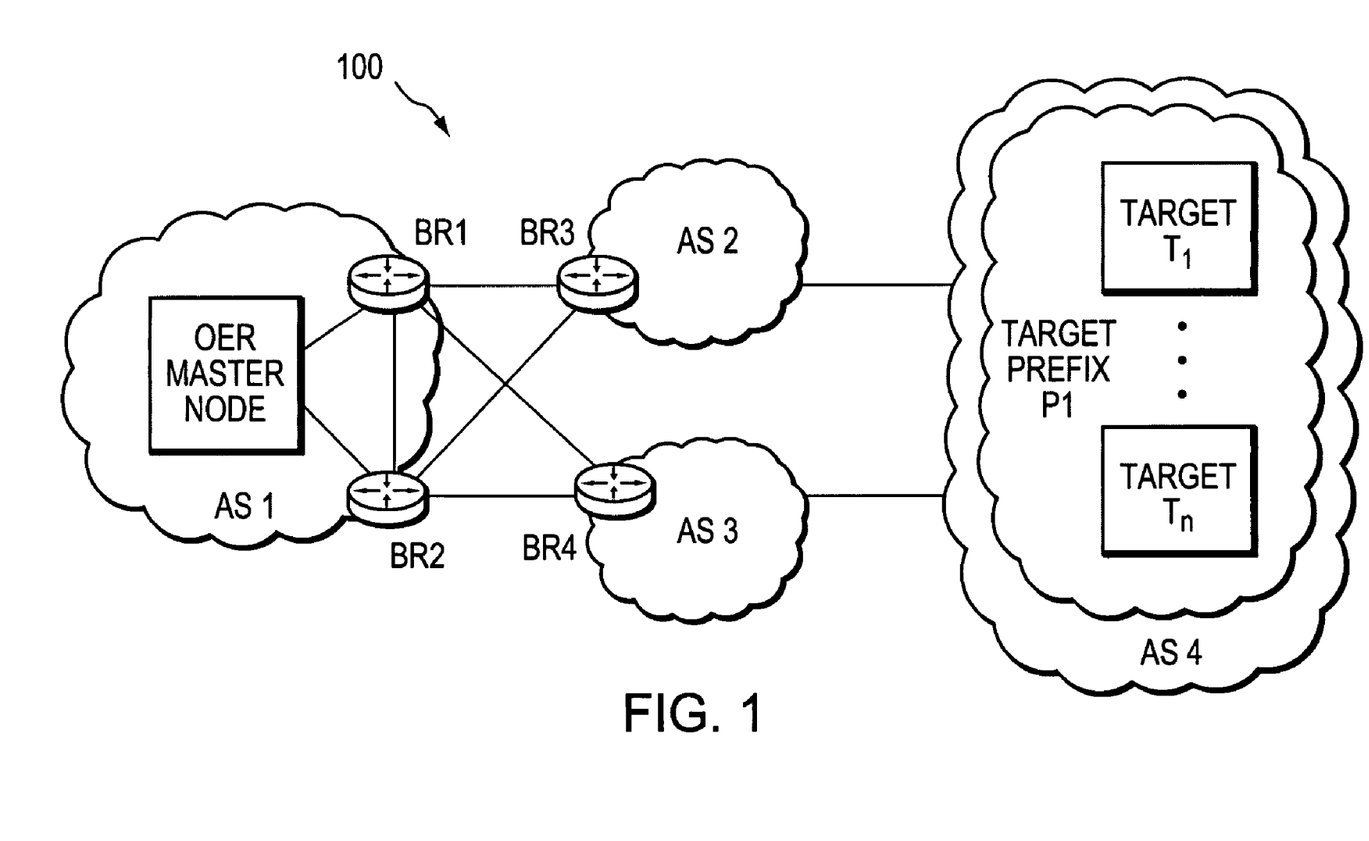
FIG. 1 is a schematic block diagram of an exemplary computer network that may be advantageously used with the present invention.

FIG. 1 is a schematic block diagram of an exemplary computer network 100 comprising a multi-homed autonomous system (AS) AS1 (e.g., an enterprise or content provider network) interconnected to AS4 (e.g., a content consumer network) via a plurality of other ASes, AS2 and AS3 (e.g., ISPs). Although each of AS1-4 is illustratively an autonomous system, those skilled in the art will appreciate that the ASes may be configured as routing domains or other networks or subnetworks. AS1 comprises one or more network nodes, including a set of communicating border nodes (illustratively, edge or border routers, BRs) BR1 and BR2, through which client communications, such as data packet traffic, can pass into and out of the AS. For example, BR1 and BR2 permit communication from AS1 to AS2 (via BR3) and AS3 (via BR4). Routing operations at the border nodes BR1-2 may be managed by an optimized edge routing (OER) "Master" node, which may be connected to the border nodes by, e.g., point-to-point links or a local area network. AS4 includes a target prefix P1, containing one or more targets or hosts T1-Tn. These examples are merely representative. Those skilled in the art will understand that any number of routers and nodes may be used in the computer network and connected in a variety of ways, and that the view shown herein is for simplicity.

Data packets may be communicated by the ASes AS1-4 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols (IGPs), such as conventional link-state or distance-vector protocols. In addition, data packets containing network topology information may be exchanged among the ASes using "external" gateway protocols, such as the Border Gateway Protocol (BGP).

Figure 2:
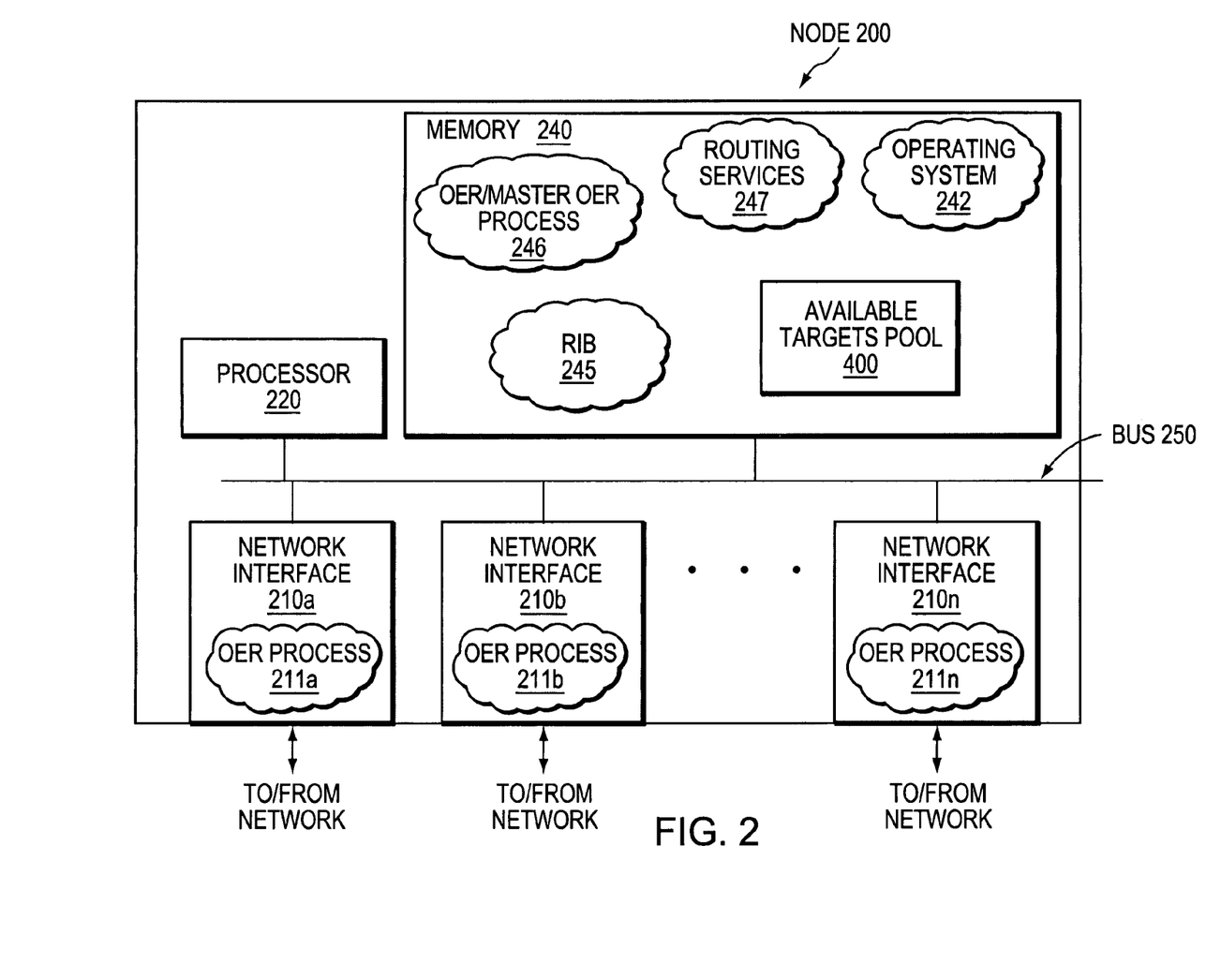
FIG. 2 is a schematic block diagram of an exemplary node that may be advantageously used with the present invention.

FIG. 2 is a schematic block diagram of an exemplary node 200 that may be advantageously used with the present invention as a border node (e.g., an edge router) or a master node. The node comprises a plurality of network interfaces 210a-n (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data, such as managing active probe packets and targets in accordance with the present invention. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as available targets pool 400. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services include Routing Information Base (RIB) 245, OER/Master OER Process 246, and routing services 247. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as IGP or BGP, in order to compute best paths/routes for installation into a routing table (not shown). The routing table is generally used for storing reachable destination addresses, a next-hop interface and next-hop address to reach each destination, and optionally other information, such as an associated metric (e.g., cost) of reaching the destination.

OER/Master OER Process 246 is illustratively employed by an OER node (e.g., border routers BR1-2) and an OER Master node (e.g., an OER Master router), respectively. The Master OER process 246 executing on the OER Master node communicates with border routers BR1-2 to request, among other things, the monitoring of a set of address prefixes. The OER processes 246 executing on the border routers monitor traffic at the edge of the AS1 and respond with, inter alia, network statistics corresponding to the monitored prefixes.

Illustratively, instances of the OER process 246 execute on the network interfaces 210 as OER processes 211a-n configured to measure various types of network statistics acquired from monitored traffic. These statistics are then forwarded from the OER processes 211a-n to the OER process 246. The statistics may correspond to various traffic measurements, such as round-trip delay times, data throughput (i.e., the amount of data transferred or received), packet loss, reachability, etc. In general, the OER processes (notably, 246 and/or 211a-n) may measure any arbitrary traffic metric, including conventional cost-based and distance-based metrics. Further, the OER Process 246 and/or 211a-n may calculate statistical averages, variances, medians, etc. of a collection of traffic measurements.

The statistics from the OER Process 246 and/or 211a-n are then processed at the Master node in accordance with the Master OER process 246. More specifically, the Master OER process 246 analyzes the statistics and determines whether the distribution of traffic entering and/or leaving the AS1 can be optimized. If so, the Master OER process may redistribute traffic routed through the border nodes by, e.g., associating new BGP local-preference values with selected traffic or statically changing the routing table contents of the border nodes. In that sense, the Master OER process selects optimal exit links (OELs) to various destination prefixes. Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes.

In order to obtain statistics in accordance with the present invention, the OER processes 246 actively probe the monitored prefix. Active probing relies on probe packets to measure various parameters associated with accessing the monitored prefix from an originating node (source). Probe packets are used by a border node to measure various parameters (e.g., jitter, delay, loss, reachability, etc.) associated with reaching the monitored prefix (e.g., a target prefix) in the network. Specifically, probe packets (requests) are generated by the border node, generally upon a request from the OER Master node, and transferred to a target node associated with the target prefix. The target node acquires each probe packet, and returns a response (reply) to the border node, such as by, e.g., modifying and returning the probe packet, returning a newly-generated response packet, or including the desired response information in a modified conventional return message (e.g., an ACK message). The border node then uses the returned probe packet to measure the various parameters associated with reaching the target prefix, and returns the results to the OER Master node.

For instance, assume that border node BR1 in AS1 measures round-trip packet delay times for traffic sent to target T1 in AS4, such as by measuring latencies of establishing a TCP session. The OER processes 246 and/or 211a-n of BR1 measure the latency between sending a TCP synchronize-sequence-number (SYN) packet to T1 and receiving a corresponding acknowledgement (ACK) packet. Alternatively, the OER processes may employ other techniques for measuring the round-trip delay times, such as issuing conventional "echo" packets (or "ping" packets). Those skilled in the art will understand that the present invention may be used with a number of protocols, such as ICMP, UDP, TCP, RTP, HTTP, etc. Notably, echo request and reply messages (echo packets) from the various protocols are described generally herein as probe packets. Moreover, it may be desirable to control the rate at which the probe packets are sent to the targets to thereby avoid refusal (filtering) by the ISP from what may appear to be a "denial of service" attack. As a result, the rate at which probe packets are sent may be limited to a very slow rate, e.g., one probe packet per minute.

Figure 3:
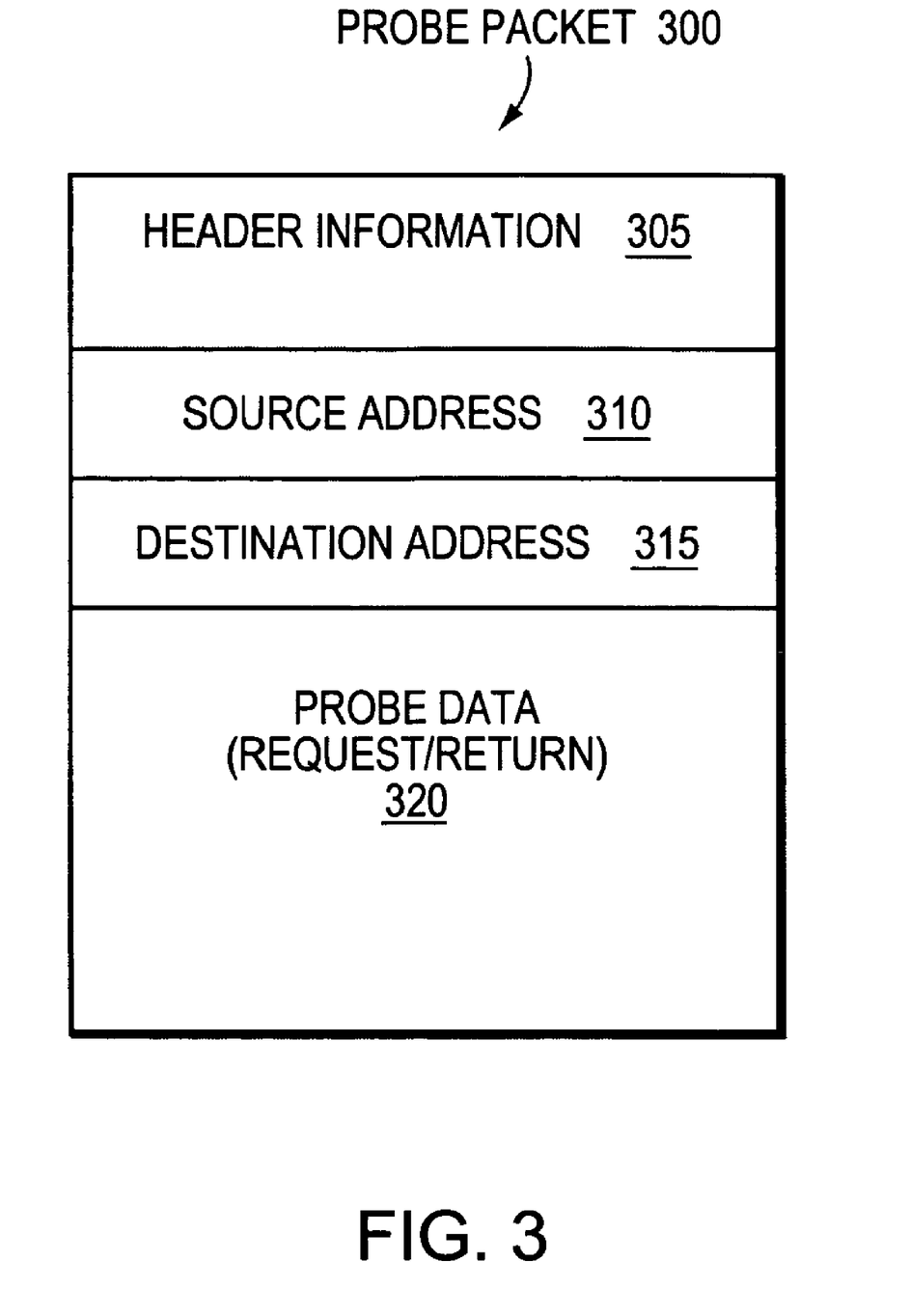
FIG. 3 is a schematic block diagram of an illustrative probe packet that may be used in accordance with the present invention.

FIG. 3 is a schematic block diagram of an exemplary probe packet 300 that may be used in accordance with the present invention. Probe packet 300 has a conventional header information field 305, such as an IP header. Source address field 310 contains the originating address of the probe packet, and destination address field 315 contains the address of the target to which the probe packet is destined. Illustratively, when the target responds to a probe packet (e.g., with a reply), the source address 310 and destination address 315 are switched (i.e., the source is the target, while the destination is the probe packet source.) Probe data field 320 contains the data pertinent to monitoring the parametric (performance) information, such as timestamps, probe identifiers, sequence numbers, etc. As further examples, probe packets for ICMP, UDP, and TCP are described in more detail in RFC 792, entitled *Internet Control Message Protocol*, published September 1981, RFC 862, entitled *Echo Protocol*, published May 1983, and RFC 1072, entitled *TCP Extensions for Long-Delay Paths*, published October 1988, respectively, the contents of each of which are hereby incorporated by reference in their entirety. Also, a technique for managing paths of the probe packets is described in above-incorporated U.S. patent application Ser. No. 11/113,629, entitled ACTIVE PROBE PATH MANAGEMENT.

The border nodes send the probe packets to various targets that represent a given monitored prefix. Targets within a given prefix may either be configured targets or learned targets. A configured target may be manually configured by a system administrator or customer at the OER Master node. An example of a configured target may be where an administrator has an agreement with the target in the prefix, e.g., such as a target using UDP. Typically, there need not be a limit on the number of configured targets for a prefix. Each configured target is assumed to be usable, such as where the agreement between networks (ASes) ensures that a valid response will be returned.

A learned target, on the other hand, is a target that may be learned by monitoring traffic at the exits. For instance, a learned target can be determined by monitoring traffic that a data connection has been made from an exit to a particular node in the monitored prefix, (e.g., by detecting a TCP connect). From this information, a list can be created of nodes within the prefix, such as T1-Tn. Notably, the target need not be located beyond an adjacent domain, and could be, e.g., located in AS2. Further, these nodes may be categorized into groups, such as those that have been used the most frequently, those that have the highest traffic throughput (bandwidth), or those with the highest delays. An exemplary software application that may be used to collect network statistics is NetFlow™ by Cisco Systems, Inc., which is described in more detail in the technical paper entitled *NetFlow Services Solutions Guide*, published September 2002, and is hereby incorporated by reference as though fully set forth herein. These learned nodes from the target prefix may then be used as the learned targets. Typically, although not necessarily, the most frequently used nodes or the nodes with the highest traffic throughput will be the most representative learned target node for a given prefix, such as a web server within the prefix. It may be desirable, however, to use configured targets prior to using learned targets. Techniques for learning address prefixes and collecting traffic statistics are described in commonly-owned copending U.S. patent application Ser. No. 10/980,550, entitled METHOD AND APPARATUS FOR AUTOMATICALLY OPTIMIZING ROUTING OPERA- TIONS AT THE EDGE OF A NETWORK, filed by Shah et al. on Nov. 3, 2004, the contents of which are hereby incorporated in its entirety.

The present invention is directed to a technique for managing targets to which probe packets are sent from a source of a computer network. The novel target management technique dynamically selects an optimal set of valid targets for a particular (monitored) prefix of the computer network. Specifically, one or more targets are selected from a pool of possible learned and configured targets to be used as representatives of the monitored prefix. Probe packets are sent from the source to the selected targets for the duration of an evaluation period. Targets that do not respond to the probe packets during the evaluation period are invalid and deselected, and if available, an unused target is selected from the pool of possible targets to replace each non-responding target for a next evaluation period. Invalid learned targets are discarded, while invalid configured targets are returned to the pool of possible targets for potential re-selection in a later evaluation period.

Figure 4A:
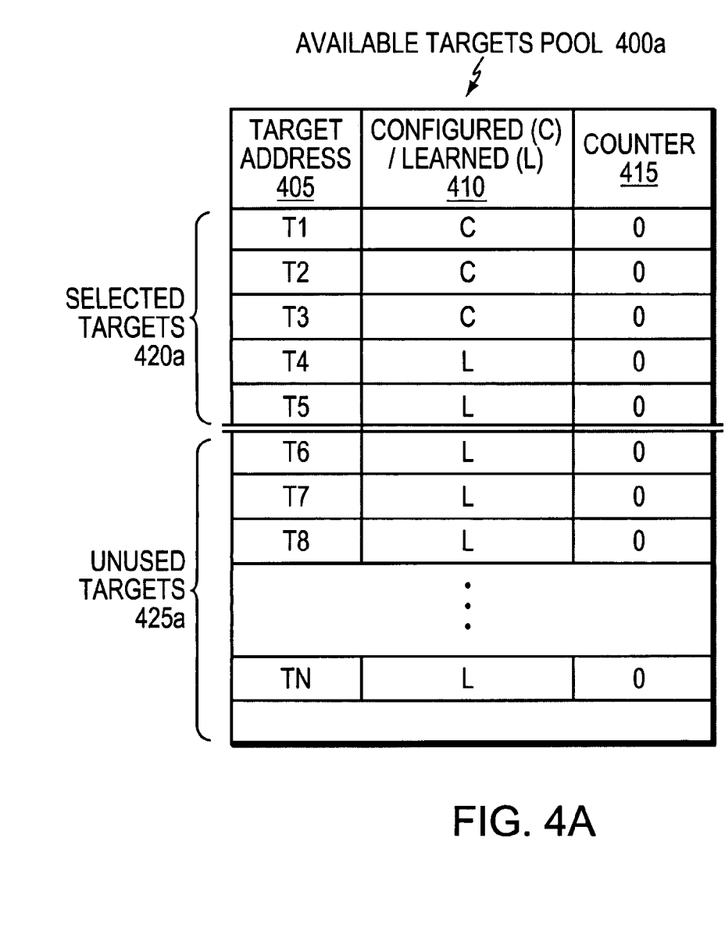
FIG. 4A is a schematic block diagram of an illustrative available targets pool that may be advantageously used in accordance with the present invention.

In accordance with one aspect of the present invention, the source maintains the pool of possible learned and configured targets. The pool is illustratively embodied as a table (ordered or unordered) of target addresses. FIG. 4A is a schematic block diagram of an illustrative available targets pool 400a that may be advantageously used in accordance with the present invention. Pool 400a is illustratively stored in memory 240 and includes one or more target entries, each having a target address field 405 for storing the addresses of the available targets configured or learned as described above (e.g., T1-TN). Also, the pool 400a may include a field 410 indicating whether the particular target is configured (C) or learned (L). Those skilled in the art will understand that the indication within the configured/learned field 410 may be in the form of the assertion of a flag, a setting of a bit, or other means known in the art, and that the use of "C" and "L" are for illustrative purposes only. Notably, the number of available targets may be unlimited, or may be configured to a maximum number of targets (e.g., thirty). Those skilled in the art will also understand that pool 400a may be arranged as any structural organization means (e.g., lists, pointers to locations in memory, etc.), and that a table format as used herein is merely one possible example. The pool 400a is illustratively maintained and managed by OER/Master OER process 246 in accordance with the present invention described herein.

The source selects one or more of targets (selected targets 420a) from the pool 400a that are used to monitor the particular (monitored) prefix at a given time. Often, a source (an OER) will have multiple targets available for a monitored prefix. Generally, however, the source will only use up to a predetermined number of selected targets for that given prefix because of various resource constraints and a desire to minimize the number of probe packets sent over the network. For example, as shown, the source selects up to five selected targets 420a at any given time. If less than the number of selectable targets (e.g., five) are available, the source may use all available targets. The targets may be selected according to a number of different methods, such as a conventional least recently used (LRU) algorithm, a round robin algorithm, randomly, or any other selection algorithm known by those skilled in the art. For example, a target (learned or configured) that is known to carry the most user data traffic may advantageously be used as one of the selected targets for a given prefix, prior to using another target with less data traffic. As noted, the source may also be configured to select configured targets prior to selecting learned targets. As shown in FIG. 4 for illustration, targets T1-T5 are selected targets of which targets T1-T3 are configured targets. The remaining unused targets 425a are stored for future use by the source during later evaluation periods. An unused target 425a is simply a target within the available targets pool 400a that is not being used at that given time (i.e., the total number of targets in pool 400a less the number of selected targets 420a). Illustratively, the unused targets 425a are targets T6-TN. Notably, the pool 400a may also contain a counter field 415 for indicating the number of times a target (e.g., a configured target) does not respond to a probe packet. This counter field may be cleared (i.e., set to zero) every time any response is received from the corresponding target, or the counter value may be maintained until cleared by the source. Illustratively, targets with a lower value in counter field 410 (i.e., that have been unsuccessfully probed less frequently) may be selected prior to targets with a higher value.

In accordance with another aspect of the present invention, the source determines the validity of a target based on the responsiveness of that target during the evaluation period. The evaluation period provides the source with logical boundaries upon which to assess the responsiveness of the targets. For instance, in certain circumstances a target may intermittently respond to probe packets, possibly indicating a network issue, which may not be indicated by assessing responsiveness to a single probe packet. In this case, by assessing the responsiveness of a target during the entire evaluation period, it may be possible to better determine if a target is not responding due to a network issue (intermittent) or because the target itself is inaccessible (no responses). Illustratively, the evaluation period may be embodied as a timed periodic schedule (e.g., every five minutes), a certain number of probe packets (e.g., ten packets), a logical cycle boundary (e.g., different phases of a probing cycle), or any other defined interval known to those skilled in the art. For example, the evaluation period may be calculated as a length of time approximately equal to a desired number of probe packets, such as by multiplying the rate at which probe packets are sent with the desired number of probes (e.g., a rate of one probe packet per minute multiplied by ten desired probe packets results in a length of time equal to ten minutes).

Assume, for example, that the evaluation period is configured to send ten probe packets (e.g., exactly ten or a time limit configured to approximately equal ten probe packets) and, as such, ten probe packets are sent to each of selected targets T1-T5, as in FIG. 4A. For illustration, further assume that T1 responds to all ten probe packets, T2 responds to all but one probe packet (i.e., nine), T3 and T4 do not respond to any probe packets, and T5 responds to only one probe packet. Those skilled in the art will understand that the source generally waits for a predetermined period of time before declaring that no response has been received (the probe "times-out"), e.g., for ninety seconds or until the end of the current evaluation period.

Figure 4B:
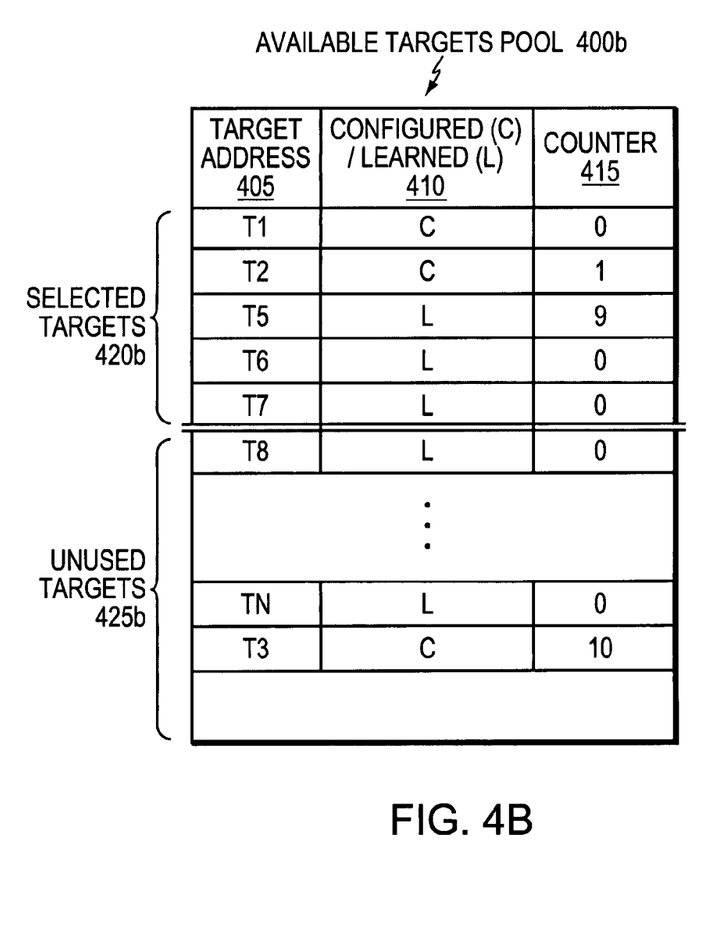
FIG. 4B is a schematic block diagram of an illustrative available targets pool after an evaluation period in accordance with the present invention.

FIG. 4B is a schematic block diagram of an illustrative available targets pool 400b after an evaluation period in accordance with the present invention. A target that responds (at least once) during the evaluation period is considered a valid target, and remains selected for use by probe packets during a next evaluation period. In the example described above, each of selected targets T1, T2, and T5 responded at least once during the evaluation period, and hence remain selected by the source. Note that the T2 and T5 now have a value within counter field 415 of "1" and "9," respectively, due to the number of times they did not respond to a probe packet (either successively or in total, as described above). A target that does not respond to any probe packet during the evaluation period, however, is considered an invalid target, and is subsequently deselected from use as a monitored prefix representative. In this case, targets T3 and T4 did not respond to any probe packets throughout the entire evaluation period, and are deemed invalid targets. Notably, a non-responding target by itself does not necessarily indicate the difference between a network failure and an inactive target. Because of the inability to differentiate the cause of non-responsiveness, the previously selected target is not as useful to the measurement of parametric information for the monitored prefix as is a target that is at least somewhat responsive. However, as will be understood by those skilled in the art, a target that was at one time responding to probe packets and has now stopped may still be included in the measurement of parametric information (i.e., the information obtained while the target was responding).

Once the invalid target is deselected, an available unused target (if any) is selected from the pool to replace the invalid target for the next evaluation period accordingly. For instance, because two targets (T3 and T4) were deselected, two unused targets (T6 and T7) from the pool 400b are added to the selected targets 420b. As those skilled in the art will understand, the newly selected targets may either replace the locations of the deselected targets (e.g., the third and fourth entry of the pool), or, as shown here, the target entries illustratively "slide" up the pool 400b to replace the deselected targets. In this way, targets are "rotated" into and out of the selected targets 420b, thus dynamically selecting the optimal set of representative targets.

If the invalid target is a learned target, it is discarded from the pool, and is not used again unless the source relearns the target sometime afterward. Target T4, for example, was a learned target, and is thus discarded and is no longer present in the available targets pool 400b. Learned targets that are discarded may be learned again in the future if the target initiates traffic during a monitoring interval, as described above. In this case, the target (e.g., T4) may then be stored as an unused target in pool 400b. On the other hand, if the invalid target is a configured target (e.g., T3), it is deselected and returned to the pool of possible targets, such as to the end of an ordered pool (e.g., a least recently used, LRU, order). Note that the value in counter field 415 for target T3 is "10," because T3 did not respond to any of the ten probe packets. The invalid configured target may be placed as the last configured target to be used again, or at the end of the entire pool (as shown), depending on configuration. The deselected configured target may be selected again once other less recently used targets are deemed invalid and returned to the pool. In this way, if the configured target starts responding again by the time it is rotated back into selected targets 420b, it may be used advantageously to measure parametric information of the monitored prefix. If, however, the configured target still does not respond, it will again be deselected from use.

Figure 5:
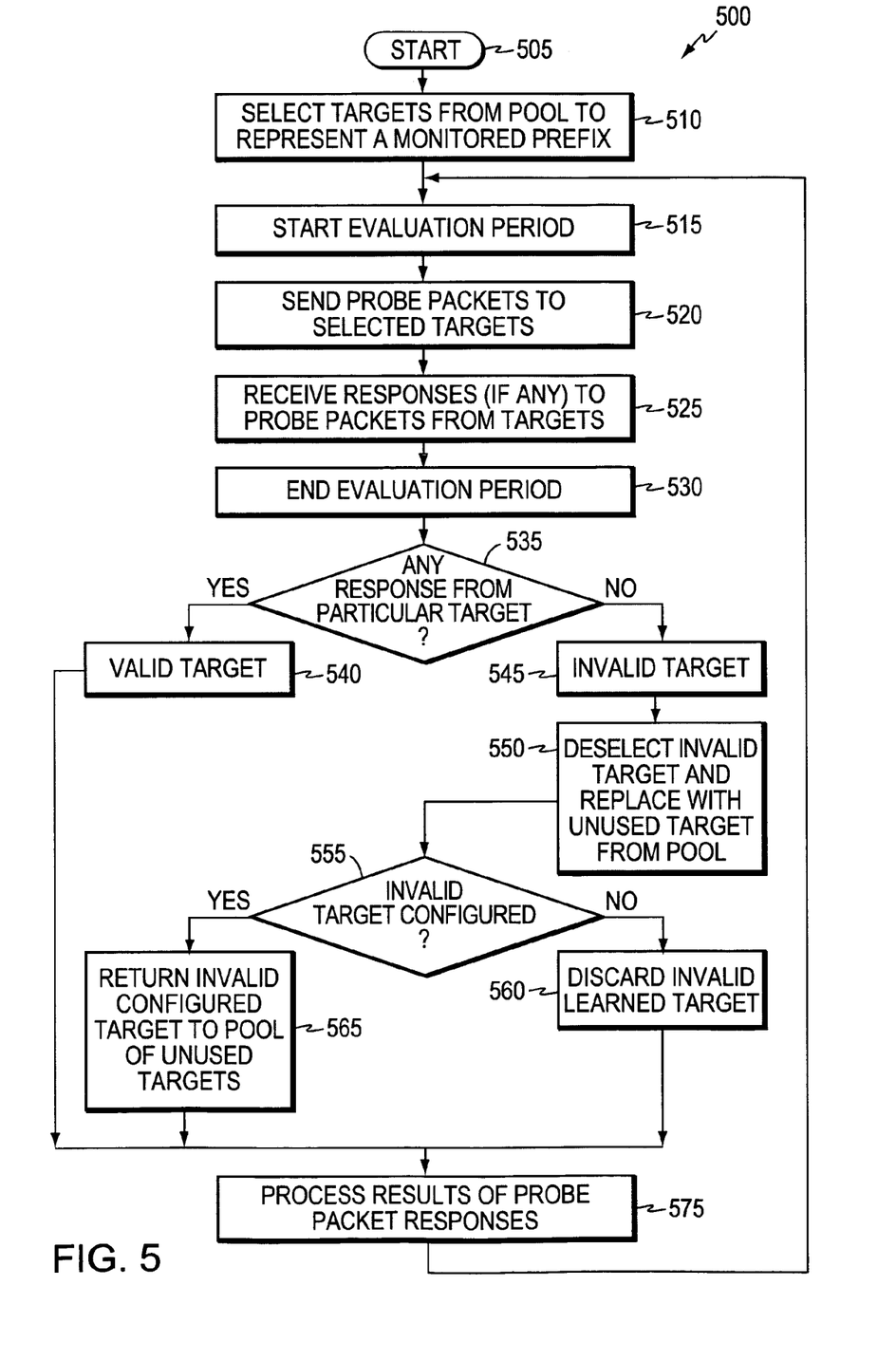
FIG. 5 is a flowchart illustrating a sequence of steps for managing targets of active probes in accordance with the present invention.

FIG. 5 is a flowchart illustrating a sequence of steps for managing targets of active probes in accordance with the present invention. The sequence 500 starts at step 505, and continues to step 510, where the source selects targets (420) from the pool of available targets 400 to represent a monitored prefix (e.g., targets T1-T5 of prefix P1). At step 515, the source starts an evaluation period, such as through initiating a timer or by beginning a probe cycle, as described above. During the evaluation period, the source sends probe packets to the selected targets in step 520, and receives responses (if any) to the probe packets from the targets in step 525. The source continues to send probe packets and receive responses in this manner until the end of the evaluation period at step 530.

In step 535, the source (or, notably, the Master OER node) determines whether any response to a probe packet was received from a particular target during the evaluation period. If so, the target is acknowledged as a valid target in step 540, and the results of the returned probe packet are processed in step 575. If no response is received for a probe packet from a particular target during the evaluation period, the non-responding target is presumed to be an invalid target in step 545. In step 550, the source deselects the invalid target and replaces it with an unused target from the available target pool 400, if an unused target exists. After the invalid target has been replaced, the source determines in step 555 whether the invalid target is a configured target. If the target has not been configured, then it is a learned target, and in step 560, the source discards the invalid learned target. Once the learned target is discarded, the source (e.g., OER/Master OER process 246) then processes the results of the discarded target (e.g., for calculating loss or reachability, etc.) in step 575. If, on the other hand, the invalid target is a configured target, it is returned to the unused targets 425 of the available targets pool 400 in step 565 to be potentially re-selected for a later evaluation period, as describe herein. The results of the invalid configured target are also processed in step 575 as mentioned above. Subsequent to step 575, the sequence 500 returns to step 515, where a new evaluation period is started with the targets selected as a result of the previous evaluation period.

Advantageously, the novel technique efficiently manages targets to which probe packets are sent from a source of a computer network. By determining the validity of the targets based on their responsiveness during an evaluation period, the novel target management technique dynamically selects the optimal set of valid targets for a monitored prefix from a pool of possible targets. This dynamically-selected optimal set may be used to learn the overall parameters associated with reaching the monitored prefix, thus avoiding the difficulty in determining the difference between a network issue and a nonresponsive target.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for managing targets to which probe packets are sent from a source in a computer network, the method comprising:

selecting one or more selected targets from a pool of targets;

sending one or more probe packets from a network interface of the source through the computer network to the selected targets during an evaluation period to determine if the selected targets are responsive to the one or more probe packets;

deselecting one or more of the selected targets that do not respond to the probe packets during the evaluation period, wherein each of the one or more deselected targets is a non-responding target;

selecting one or more unused targets from the pool of targets to replace, one or more non-responding targets for a next evaluation period; and retaining one more of the selected targets that do respond to the probe packets for the next evaluation period.

2. The method as in claim 1, wherein the pool of targets comprises learned targets.

3. The method as in claim 2, further comprising: discarding deselected learned targets from the pool of targets.

4. The method as in claim 1, wherein the pool of targets comprises configured targets.

5. The method as in claim 4, further comprising: returning deselected configured targets to the pool of targets.

6. The method as in claim 1, wherein the evaluation period is selected from the group consisting of: a certain number of probe packets, a certain length of time, and a logical cycle boundary.

7. The method as in claim 1, wherein the selected targets are selected according to a method selected from the group consisting of: a least recently used (LRU) algorithm, a round robin algorithm, and a random selection algorithm.

8. A system for managing targets to which probe packets are sent in a computer network, the system comprising:
a source, in a computer network, configured to,
i) select one or more selected targets from a pool of targets,
ii) send one or more probe packets to the selected targets during an evaluation period to determine if the selected targets are responsive to the one or more probe packets,
iii) deselect one or more of the selected targets that do not respond to the probe packets during the evaluation period, wherein each of the one or more deselected targets is a non-responding target,
iv) select one or more unused target from the pool of targets to replace one or more non-responding targets for a next evaluation period, and
v) retain one or more of the selected targets that do respond to the probe packets for the next evaluation period.

9. The system as in claim 8, wherein the pool of targets further comprises: learned targets.

10. The system as in claim 9, wherein the source is configured to discard deselected learned targets from the pool of targets.

11. The system as in claim 8, wherein the pool of targets further comprises: configured targets.

12. The system as in claim 11, wherein the source is configured to return deselected configured targets to the pool of targets.

13. The system as in claim 8, wherein the evaluation period is selected from the group consisting of: a certain number of probe packets, a certain length of time, and a logical cycle boundary.

14. The system as in claim 8, wherein the selected targets are selected according to a method selected from the group consisting of: a least recently used (LRU) algorithm, a round robin algorithm, and a random selection algorithm.

15. An apparatus for managing targets to which probe packets are sent from a source in a computer network, the apparatus comprising:
means for selecting one or more selected targets from a pool of targets;
means for sending one or more probe packets from the source to the selected targets during an evaluation period to determine if the selected targets are responsive to the one or more probe packets;
means for deselecting one or more of the selected targets that do not respond to the probe packets during the evaluation period, wherein each of the one or more deselected targets is a non-responding target;
means for selecting one or more unused targets from the pool of targets to replace one or more non-responding targets for a next evaluation period; and
means for retaining one or more of the selected targets that do respond to the probe packets for the next evaluation period.

16. A tangible computer readable medium containing executable program instructions for managing targets to which probe packets are sent from a source in a computer network, the executable program instructions comprising program instructions for:
selecting one or more selected targets from a pool of targets;
sending one or more probe packets from the source to the selected targets during an evaluation period to determine if the selected targets are responsive to the one or more probe packets;
deselecting one or more of the selected targets that do not respond to the probe packets during the evaluation period, wherein each of the one or more deselected targets is a non-responding targets;
selecting one or more unused targets from the pool of targets to replace one or more non-responding targets for a next evaluation period; and
retaining one or more of the selected that do respond to the probe packets for the next evaluation period.

17. An apparatus, comprising:
a network interface;
a memory operable to store a data structure indicating a pool of targets in a computer network to which probe packets may be sent;
a processor operable to send, via the network interface, one or more probe packets to selected targets of the pool of targets to determine if the selected targets are responsive to the one or more probe packets, to deselect one or more selected targets in response to one or more selected targets that do not respond to the probe packets during an evaluation period, to select one or more unselected targets from the pool of targets to replace one or more deselected targets for a next evaluation period, and to retain one or more selected targets that do respond to the probe packets for the next evaluation period.

18. The apparatus as in claim 17, wherein the pool of targets further comprises learned targets.

19. The apparatus as in claim 18, wherein the processor is further operable to discard deselected learned targets from the pool of targets.

20. The apparatus as in claim 17, wherein the pool of targets further comprises configured targets.

21. The apparatus as in claim 20, wherein the processor is further operable to return deselected configured targets to the pool of targets.

22. The apparatus as in claim 17, wherein the evaluation period is selected from the group consisting of: a certain number of probe packets, a certain length of time, and a logical cycle boundary.

* * * * *

UNITED STATES PATENT AND TRADEMARK OFFICE
CERTIFICATE OF CORRECTION

PATENT NO. : 7,675,861 B2 Page 1 of 1
APPLICATION NO. : 11/113582
DATED : March 9, 2010
INVENTOR(S) : Larry R. Metzger It is certified that error appears in the above-identified patent and that said Letters Patent is hereby corrected as shown below:

Col. 13, Line 5 should read:

the probe or packets for the next evaluation period.

Col. 14, Line 26 should read:

targets is a non-responding target[[s]];

Col. 14, Line 30 should read:

retaining one or more of the selected targets that do respond to the Signed and Sealed this Third Day of August, 2010

David J. Kappos
*Director of the United States Patent and Trademark Office*